(12) United States Patent
Carbune et al.

(10) Patent No.: US 10,389,866 B2
(45) Date of Patent: Aug. 20, 2019

(54) ADVANCED CONTENT RETRIEVAL

(71) Applicant: Google LLC, Mountain View, CA (US)

(72) Inventors: Victor Carbune, Basel (CH); Sandro Feuz, Zurich (CH)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/698,734

(22) Filed: Sep. 8, 2017

(65) Prior Publication Data

US 2019/0082046 A1    Mar. 14, 2019

(51) Int. Cl.
*H04M 3/42* (2006.01)
*H04M 1/725* (2006.01)
*G06F 16/951* (2019.01)
*G06Q 20/14* (2012.01)

(52) U.S. Cl.
CPC ...... *H04M 1/72566* (2013.01); *G06F 16/951* (2019.01); *H04M 1/72569* (2013.01); *G06Q 20/145* (2013.01); *H04M 2201/42* (2013.01); *H04M 2215/0116* (2013.01); *H04M 2242/14* (2013.01); *H04M 2242/28* (2013.01)

(58) Field of Classification Search
CPC .............................................. H04M 1/72566
USPC ..................................................... 455/414.1
See application file for complete search history.

(56) References Cited

U.S. PATENT DOCUMENTS

| | | |
|---|---|---|
| 5,978,841 A | 11/1999 | Berger |
| 6,256,633 B1 | 7/2001 | Dharap |
| 8,495,083 B2 | 7/2013 | Liebling |

FOREIGN PATENT DOCUMENTS

| | | |
|---|---|---|
| WO | WO 2014/004264 | 1/2014 |
| WO | WO 2014/194441 | 12/2014 |

OTHER PUBLICATIONS

PCT International Search Report and Written Opinion issued in International Application No. PCT/US2018/032093, dated Aug. 16, 2018, 15 pages.

(Continued)

*Primary Examiner* — Charles T Shedrick
(74) *Attorney, Agent, or Firm* — Fish & Richardson P.C.

(57) ABSTRACT

Methods, systems, and apparatuses, including computer programs encoded on a computer-readable storage medium for implementing advanced information retrieval are described. A user may provide fetching parameter values to acquire content. The system may determine whether or not the user-provided fetching parameter values can be satisfied. If the fetching parameters can be satisfied, the system obtains and caches the information.

22 Claims, 3 Drawing Sheets

(56) References Cited

OTHER PUBLICATIONS

'androidforums.com' [online] "How to use app Advance Download Manager," Available on or before Feb. 6, 2017 [retrieved on Apr. 9, 2019] Retrieved from Internet: URL<https://androidforums.com/threads/how-to-use-app-advance-download-manager.1117901/> 3 pages.

'play.google.com' [online] "Advanced Download Manager," Last updated Feb. 20, 2019, [retrieved on Apr. 9, 2019] Retrieved from Internet: URL<https://play.google.com/store/apps/details?id=com.dv.adm&hl=en_US> 3 pages.

'quora.com' [online] "Is there an Android app which can schedule download (means it can start and stop download at scheduled)?" Available on or before Jan. 26, 2017, [retrieved on Apr. 9, 2019] Retrieved from Internet: URL<https://www.quora.com/Is-there-any-Android-app-which-can-schedule-download-means-it-can-start-and-stop-download-at-scheduled-time> 7 pages.

'wikipedia.org' [online] "Tasker (Application)," Last updated on Jun. 13, 2018 [retrieved on Apr. 9, 2019] Retrieved from Internet: URL<https://en.wikipedia.org/wiki/Tasker_(application)> 3 pages.

FIG. 1A
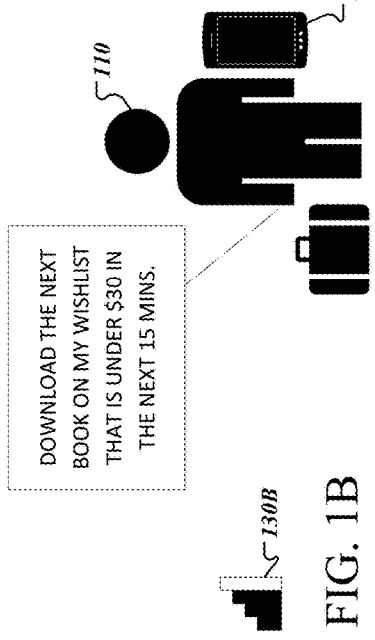
FIG. 1B
FIG. 1C
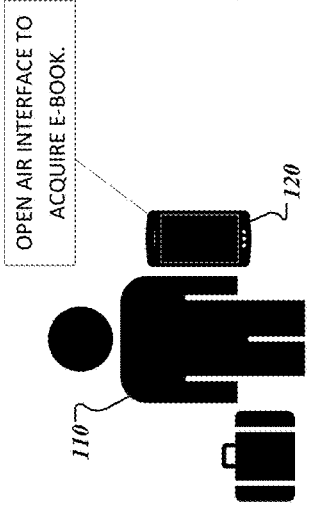
FIG. 1D
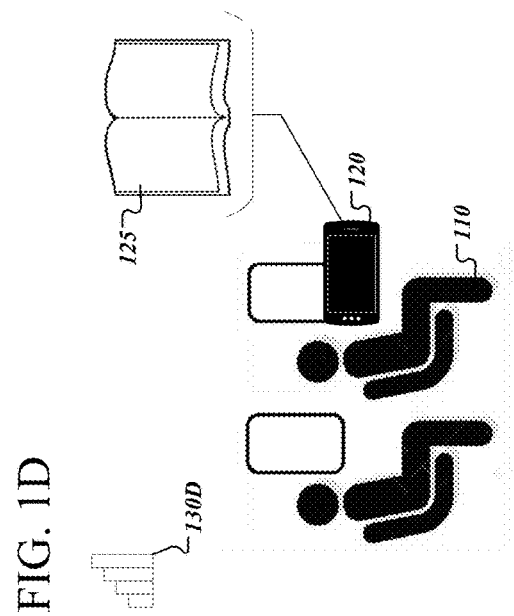
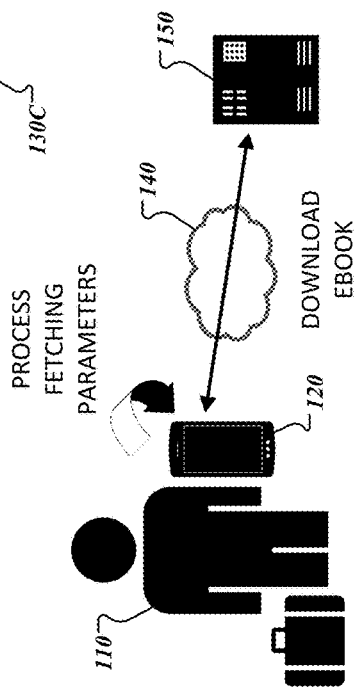

ADVANCED CONTENT RETRIEVAL

FIELD

This disclosure generally relates to data communication.

BACKGROUND

Users increasingly rely on portable electronic devices to access information or obtain data on demand. However, users may experience difficulties accessing information when their devices lack wireless network connection.

SUMMARY

This disclosure generally describes systems and methods for retrieving data before a time period at which no network connection is expected.

Innovative aspects of the subject matter described in this specification include, in some implementations, a computer-implemented method to perform operations. The operations include receiving, by one or more computing devices, a request to acquire data at a first future time using a graphical user interface displayed by a user device, receiving, by the one or more computing devices, one or more parameters to configure an acquisition of the data at the first future time, and determining, by the one or more computing devices, whether the data is downloadable according to the one or more parameters at the first future time. In response to determining that the data is downloadable according to the one or more parameters, the one or more computing devices obtains, from one or more content delivery servers, the data at the first future time, receives a request to output the obtained data at a second future time that occurs after the first future time, and in response to receiving the request to output the obtained data at the second future time, controls a display connected to the user device to output the obtained data at the second future time.

Implementations may each optionally include one or more of the following features. For instance, in some implementations, the one or more parameters include a content type, a content size, a likely financial cost to purchase the data, and a wireless connectivity threshold.

In some implementations, the operation of determining, by the one or more computing devices, whether the data is downloadable according to the one or more parameters at the first future time includes determining a likely level of wireless connectivity of the user device at the first future time, and determining that an entirety of the data is downloadable at the determined likely level of wireless connectivity during a threshold time period beginning with the first future time.

In some implementations, the threshold time period is (i) a time period during which the user device is likely to remain connected to a wireless network at or above a particular wireless connectivity threshold level, or (ii) a time period selected by a user input.

In some implementations, the second future time is a time at which the user device is not connected to a wireless network.

In some implementations, the operation of determining, by the one or more computing devices, whether the data is downloadable according to the one or more parameters at the first future time includes determining a likely level of wireless connectivity of the user device at the first future time, determining that an entirety of the data is not downloadable at the determined likely level of wireless connectivity during a threshold time period beginning with the first future time, and generating a rejection message indicating that the data cannot be acquired.

In some implementations, the operation of determining, by the one or more computing devices, whether the data is downloadable according to the one or more parameters at the first future time includes one or more of: determining that the user device has access to store data having the content size and the content type in a storage unit, and determining that payment information for purchasing the data is valid and accessible by the one or more computing devices.

Other implementations of these aspects include corresponding systems, apparatus, computer-readable storage mediums, and computer programs configured to implement the actions of the above-noted methods.

The details of one or more implementations are set forth in the accompanying drawings and the description below. Other features and advantages will become apparent from the description, the drawings, and the claims.

BRIEF DESCRIPTION OF THE DRAWINGS

FIGS. 1A-1D depict exemplary scenarios of advanced information retrieval.

Like reference numbers and designation in the various drawings indicate like elements.

DETAILED DESCRIPTION

Figure 2:
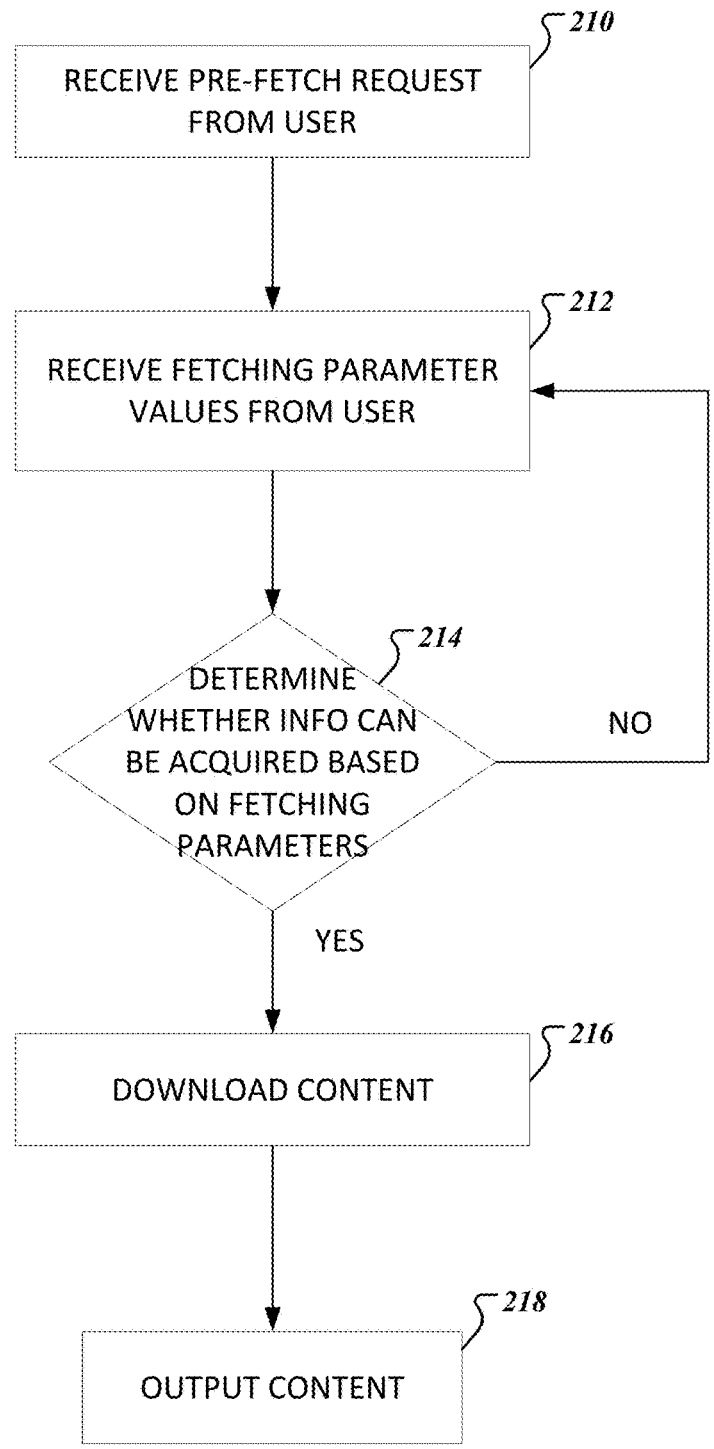
FIG. 2 depicts a flowchart of an exemplary method for advanced information retrieval.

According to implementations, methods and systems for advanced retrieval of information to be output at a future time are described. A user may request a user device to obtain information and provide fetching parameter values for acquiring the information. The fetching parameters may include one or more parameters such as an amount of time the user anticipates being without network connectivity, a time duration that the user is likely to remain wirelessly connected, information content to acquire, a size limit for the information to be acquired, an application (app) for which the information is to be used, a financial threshold for acquiring the information, a minimum battery threshold to sustain while acquiring the information, and a minimum network connectivity threshold during the time the information is being acquired. The system may determine whether or not information may be acquired based on the fetching parameter values provided by the user. If the information can be acquired, the system obtains and caches the information. The stored information may then be output whenever the user would like to output the information, for example, when the user does not have a wireless network connection.

The advanced information retrieval methods and systems described in this specification offer a number of advantages. For example, a user may be able to schedule information acquisition ahead of a particular time when the user does not expect to have any wireless connection. As an example, if the user expects to be traveling on a flight or boat and not having Internet access, the user can schedule data acquisition of any content prior to boarding the flight. The user can enter parameters for controlling the acquisition of data. After entering the parameters, the user can direct the user's attention elsewhere as the user device will execute one or more operations in the background while the user engages in any other activity. The content item is stored in the user device and ready for access at any time in the future. In this manner, the user can exercise great control over the data acquisition process with added convenience by controlling costs and timing associated with advanced data acquisition FIGS. 1A-1D depict exemplary scenarios of advanced information retrieval and are generally related to a user 110 with a user device 120 preparing to board a flight at a Departure lounge. Referring to FIG. 1A, the user device 120 may be connected to a wireless network, such as an airport's WiFi network. The wireless connection may have a signal strength 130A. The user 110 may select an Advance Information Retrieval (AIR) interface and request the user device 120 to download an electronic book (E-Book).

The AIR interface may be configured to communicate with various apps on the user device 120 and to exchange data with the apps. For example, an app, such as a media output app, may provide information of one or more songs on a playlist or wish list of the user 110. As another example, a virtual library may provide the AIR interface a listing of electronic books that the user 110 has downloaded or that have been selected by the user 110 on a wish list of the user 110. A wish list may refer to data that the user 110 does not yet have access to or has not yet downloaded onto the user device 120, but would like to access in future.

In response to receiving the request, the user device 120 may display a fetching parameter interface through the AIR interface. The user 110 may provide values for the fetching parameters to configure the acquisition of the E-book. As shown in FIG. 1B, the user 110 specifies a time duration, e.g., next 15 minutes, during which the E-Book should be downloaded, a financial threshold, e.g., $30, for acquisition of the E-Book, and an identification of the information to be downloaded, e.g., the next book on the user's wish list.

In general, the user 110 may provide various parameters to configure the acquisition of information. The parameters may include one or more of an amount of time the user 110 anticipates not having access to a network, a time duration that the user 110 is likely to remain wirelessly connected, an identification of the information to acquire, a size limit for the information to be acquired, an app for which the information is to be used, a financial threshold for acquiring the information, a minimum battery threshold to sustain while acquiring the information, and a minimum network connectivity threshold while acquiring the information. Although not shown in the scenario depicted in FIG. 1B, the user 110 may additionally specify that the E-Book should be downloaded if the user device 110 has a particular network connectivity strength threshold.

As shown in FIG. 1C, after receiving values for the fetching parameters, the user device 110 processes the fetching parameters by executing one or more operations to determine whether information that the user 110 has requested can be acquired based on the fetching parameter values provided by the user 110. For example, the user device 120 may communicate with an electronic library application installed in the user device 120 to obtain data identifying the next book on the user's wish list. The user device 120 may, without receiving any further user input, conduct a search for the identified E-book through various sources such as a database, server, Internet website, or cloud directory that provides the E-book, and filter the search results to identify one or more E-book resources 150 through which the E-book may be obtained.

The user device 120 may communicate with any of the identified E-book resources 150 to obtain acquisition data such as a size of the E-book and a cost to purchase the E-book. Based on the acquisition data, the user device 120 i) determines whether the user device 120 has sufficient storage available to store an electronic file corresponding to the E-book; ii) predicts how long it may take to download the E-book and one or more variations in the predicted download time period based on variations in the wireless network signal strength, and iii) determines one or more payment methods that the user 110 has identified for supporting payments for the acquisition of information.

In some implementations, the user device 120 may also predict the likely network connectivity of the user device 120 in the next 15 minutes. For example, if the user device 120 is connected to a WiFi network of the airport, the user device 120 may determine that the user device 120 is likely to have the same or stronger signal strength for the next 15 minutes. As another example, if the user device 120 is connected to a cellular network, the user device 120 may determine that the user device 120 is unlikely to have required signal strength during the next 15 minutes.

Based on the above-noted retrieved data and determinations, the user device 120 may then determine if the E-book can be downloaded while satisfying the fetching parameters and determine if sufficient funds are available for acquiring the information based on the user-specified financial threshold. In particular, the user device 120 may determine if the E-book can be downloaded at or above the particular network connectivity strength threshold in less than 15 minutes, and that any payment required to acquire the E-book can be made. In the scenario depicted in FIG. 1C, the user device 120 determines that the fetching parameters can be satisfied and that the E-book can be downloaded as soon as the network connectivity strength 130C is at or above the particular network connectivity strength threshold.

When a network connectivity strength 130C satisfies the particular network connectivity strength threshold, the user device 120 begins acquiring the E-book. To acquire the E-book, the user device 120 may execute any operation to purchase the E-book through the payment methods identified by the user 110, and to download an electronic file corresponding to the E-book. When the electronic file corresponding to the E-book has been downloaded, the user device 120 may cache the electronic file in a memory local to the user device 120.

As shown in FIG. 1D, when the user 110 is seated in the airplane and has no wireless network connectivity 130D, the user 110 may wish to read the downloaded E-book 125 through user device 120. The user 110 may then execute the electronic library application and begin reading the E-book 125 while seated in the airplane and without having any wireless network connectivity.

Although the implementations described above include descriptions of operations performed by the user device 120, in some implementations, some or all of the one or more operations executed to process the fetching parameters may be performed by a server connected to the user device 120.

FIG. 2 depicts a flowchart of an exemplary method for advanced information retrieval. The operations in FIG. 2 will be described as being implemented by a system, and may be executed by a user device or a server or processor connected to a user device.

In operation 210, the system may receive a pre-fetch request from the user. The system may receive the pre-fetch request using various suitable methods. For example, a user device may receive an input through an AIR interface. The input may be, for example, a touch input received through a touch screen on the user device or an audio signal emitted from the user's mouth indicating that the user would like to initiate a pre-fetch function. Other methods of receiving an input, such as utilizing a motion sensor, gyroscope, or haptic feedback sensor to detect motions or gestures corresponding to a pre-fetch request may also be used.

After receiving the pre-fetch request, the system may activate and display a fetching parameter interface through the AIR interface. In operation 212, the system may receive one or more values from the user to configure the fetching parameters. The parameters may include one or more of an amount of time the user anticipates not having access to a network, a time duration that the user is likely to remain wirelessly connected, an identification of the information to acquire, a size limit for the information to be acquired, an app for which the information is to be used with, a financial threshold for acquiring the information, a minimum battery threshold to sustain while acquiring the information, and a minimum network connectivity threshold while acquiring the information.

In some implementations, the amount of time the user anticipates not having access to a network may be a time period in future that the user device is likely not going to be connected to a wireless network. In some implementations, the time duration that the user is likely to remain wirelessly connected may refer to an amount of time or a specific time up to which the user anticipates losing wireless connectivity. For instance, a user may indicate that the user is likely to lose wireless connectivity at, for example, 4:23 PM, or in about, for example, 35 minutes. In some implementations, the user may schedule one or more of a particular date and time to begin the acquisition of data and a particular date and time to terminate the acquisition of data.

In some implementations, the identification of the information to acquire may include an electronic file name or a content identifier such as a name or reference number. In some implementations, the user may also provide data indicative of a resource, such as a website, database, or network address, from which the information may be acquired.

In some implementations, the financial threshold for acquiring the information may include a maximum amount of money (e.g., dollars) the user is willing to spend on acquiring the information. When providing financial threshold information, the user may also provide information for processing payments, such as credit card information or a payment service account.

In some implementations, the minimum battery threshold to sustain while acquiring the information and the minimum network connectivity threshold during the time the information is being acquired may include percentage thresholds. For example, the user may indicate that the user device should have at least, for example, 10% battery power remaining and should fetch information when the user device has a wireless signal strength that is at least 50% of the maximum signal strength.

After receiving values for the fetching parameters, the system may determine whether the requested information can be acquired based on the fetching parameter values provided by the user (operation 214). To determine whether the requested information can be acquired, the system performs one or more of the following operations.

In some implementations, the system may conduct a search for the information requested by the user, as described above, and identify one or more resources from which the information can be acquired. The system may then determine a data size or file size of the information to be acquired from the one or more resources. For example, the system may determine that a file having a size of 10 MB may be obtained from a first resource and that a file having a size of 13 MB may be obtained from a second resource. The system may then determine whether the user device has sufficient storage available to store the file associated with the information.

In some implementations, if a payment is required to obtain the information, the system may determine if the required payment is less than or within the financial threshold specified by the user.

In some implementations, if the user has not provided any information indicating a time duration that the user is likely to remain wirelessly connected, the system may predict the time duration. For example, if a user utilized an electronic boarding pass at the airport, the user device may determine that the user device may have wireless connection access from the current or present time to the boarding time of the flight. In general, the system may obtain data that indicates a time at which a likely change in the wireless connection status or a physical environment of the user device will occur. The system may then calculate the difference from the present time to the time at which a likely change in the wireless connection status or a physical environment of the user device will occur. The calculated time difference may correspond to the time duration that the user is likely to remain wirelessly connected.

In some implementations, the system may search the user device's location history and determine if the user device has been in the present location before. If the user device has been in the present location before, the system may calculate an average amount of time the user device typically remains in the location, and set this average time as the time duration that the user is likely to remain wirelessly connected.

In some implementations, the system may determine the likely wireless connection strength for the amount of time the user is likely to remain wirelessly connected. The system may use one or more signals to determine the likely wireless connection strength. For example, in some cases, the system may search the user device's location history and determine if the user device has been in the present location before. If the user device has been in the present location before, the system may determine the average wireless signal strength that the user device had when located in the present location in the past.

In some cases, the system may determine the likelihood of the user's device wireless connectivity status to change based on the user device's location. For example, if the system determines that the user device's location is rapidly changing or that the user device is moving in a pattern that corresponds to vehicular movement, the system may determine that the wireless connectivity of the user device is likely to change frequently and may not remain at the present connectivity level.

In some cases, the system may determine that the user device is located at a building or facility, such as a shopping mall, office, school, or café, and that the user device's position is not changing. The system may then determine that the wireless connectivity level is likely to remain unchanged at the existing connectivity level. As should be appreciated from the foregoing, various methods may be used to determine the likely wireless connection strength of the user device for the amount of time the user is likely to remain wirelessly connected.

In some implementations, after determining a data size or file size of the information to be acquired from the one or more resources and the likely strength of the wireless connection, the system may determine the time required to acquire the information based on the likely wireless connection strength. For example, the system may predict the likely data rate at which data will be received at the likely wireless connection strength, and utilize the likely data rate to determine the likely time required to acquire the information. The system may compare the likely time required to acquire the information with the time duration that the user device is likely to remain wirelessly connected to determine if sufficient time is available to acquire the information. In some cases, as shown in exemplary TABLE I below, the system may also calculate the time required to acquire the information based on variations in the likely wireless connection strength.

TABLE I

| Information Size | Likely Wireless Connectivity | Time Required | Time Available | Sufficient time? |
|---|---|---|---|---|
| 10 MB | Excellent (95%) | 5 mins | 10 mins | Yes |
| 10 MB | Good (75%) | 8 mins, 30 sec | 10 mins | Yes |
| 10 MB | Poor (40%) | 12 mins | 10 mins | No |
| 10 MB | Very poor (5%) | 20 mins | 10 mins | No |

The data shown in TABLE I is for illustrative purposes. As noted in TABLE I, when the size of the information requested by the user is 10 MB, the system may determine that the information may be acquired from a resource at wireless connectivity strengths of 75% or 95% of the maximum signal strength, but not for wireless connectivity strengths of 40% or 5% because the information will not have been downloaded from the resource in the available time.

The system may also implement other variations of TABLE I that include, for example, variations in the likely wireless connection strength, variations in the information size based on the different resources, variations in the user device's battery levels, and any other relevant variation.

Based on the above-noted operations, the system may determine whether the requested information can be acquired. For example, in some implementations, the system may determine that the information can be acquired if one or more of the following conditions are satisfied: the user device is predicted to sustain a battery level greater than the minimum threshold level provided by the user for the time duration that the user is likely to remain wirelessly connected; the user device is predicted to sustain a wireless connection level greater than the minimum threshold level provided by the user for the time duration that the user is likely to remain wirelessly connected; payment for accessing the information can be made based on the user-provided financial threshold; the requested information can be obtained from one or more resources; a data size of the requested information is equal to or less than the available storage in the user device; and a time available to acquire the requested information exceeds the time required to acquire the requested information.

The conditions that should be satisfied to determine that the user requested information can be acquired depend on the fetching parameters that the user provided. For example, if the user only provides values for fetching parameters that specify a file size and a minimum battery threshold, the system will determine that the user requested information can be acquired as along as conditions associated with the file size and the minimum battery threshold are satisfied. In some implementations, the user device may apply a default setting that requires a default set of fetching parameters to be provided by the user.

If the system determines that the information can be acquired using the user's fetching parameters, the user device downloads the information from an identified resource in operation 216. The downloaded information may be stored in any suitable storage unit in the user device, such as a cache memory. In some implementations, the system may determine if the user device has access or authorization to store data in a storage unit that has the capacity to store the downloaded information. If the user device has access or authorization, the user device may store the downloaded information at the storage unit. If the user device does not have access or authorization, the user device may query the user to provide an input indicative of a location where the user would like to store the downloaded information.

In operation 216, if a payment is required, the system may also conduct a payment to acquire the requested information utilizing the financial information provided by the user.

In operation 218, the downloaded and stored information may be output at any time of the user's choice. For example, the user may open an app and select the acquired information for output. The information may be output in various ways. For example, if the downloaded information corresponds to a media file, the downloaded information may be output as an audio signal. In some cases, the downloaded information may be output through a display device connected or coupled to the user device.

In some implementations, the system may determine that the information cannot be acquired if one or more of the following conditions are satisfied: the user device will likely not sustain a battery level greater than the minimum threshold level provided by the user for the time duration that the user is likely to remain wirelessly connected; the user device will likely not sustain a wireless connection level greater than the minimum threshold level provided by the user for the time duration that the user is likely to remain wirelessly connected; payment for accessing the information cannot be made based on the user-provided financial threshold; the requested information cannot be obtained from one or more resources; a data size of the requested information is greater than the available storage in the user device; and a time available to acquire the requested information is less than the time required to acquire the requested information.

If the system determines that the information cannot be acquired, in some implementations, the user device may output a message to the user indicating that the requested information cannot be obtained under the fetching parameter values provided by the user. The user device may then prompt the user to enter revised values for the fetching parameters.

Figure 3:
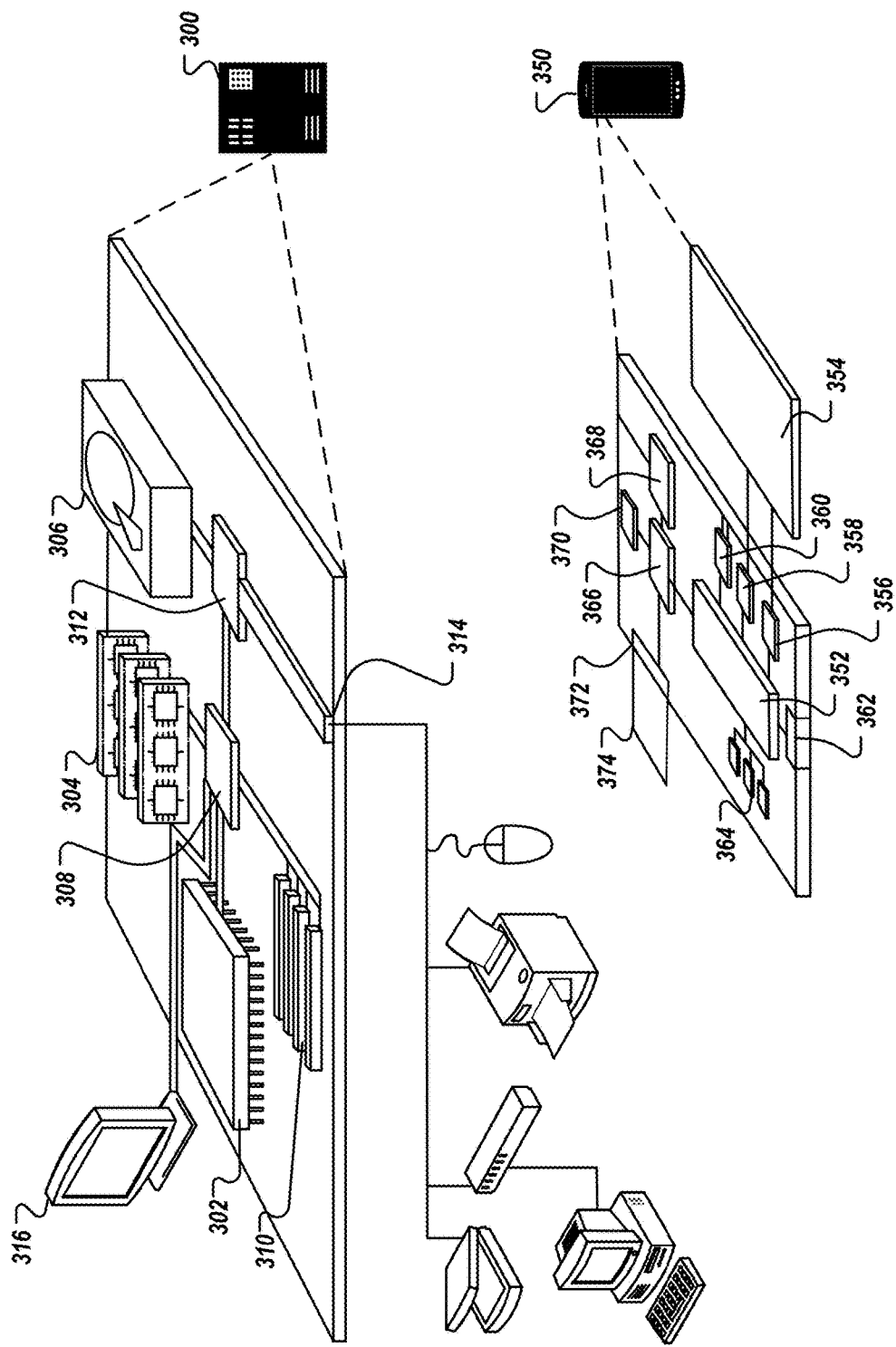
FIG. 3 depicts an exemplary system that provisions advanced information retrieval.

Embodiments and all of the functional operations and/or actions described in this specification may be implemented in digital electronic circuitry, or in computer software, firmware, or hardware, including the structures disclosed in this specification and their structural equivalents, or in combinations of one or more of them. FIG. 3 is a block diagram of computing devices 300, 350 that may be used to implement the systems and methods described herein. Computing device 300 represents various forms of digital computers, such as workstations, servers, blade servers, mainframes, and other appropriate computers. Computing device 350 represents various forms of user devices, such as personal digital assistants, cellular telephones, smartphones, smart televisions, watches, and other similar computing devices. The components shown here, their connections and relationships, and their functions, are exemplary, and do not limit implementations described herein.

Computing device 300 includes a processor 302, memory 304, a storage device 306, a high-speed interface 308 connecting to memory 304 and high-speed expansion ports 310, and a low speed interface 312 connecting to low speed bus 314 and storage device 306. Each of the components 302, 304, 306, 308, 310, and 312, are interconnected using various busses, and may be mounted on a common motherboard or in other manners. The processor 302 can process instructions for execution within the computing device 300, including instructions stored in the memory 304 or on the storage device 306 to display graphical information for a GUI on an external input/output device, such as display 316 coupled to high speed interface 308. In some implementations, multiple processors and/or multiple buses may be used, as appropriate, along with multiple memories and types of memory. Also, multiple computing devices 300 may be connected, with each device providing portions of the necessary operations (e.g., as a server bank, a group of blade servers, or a multi-processor system). In general, the processor 302 may control operations of the computing device 300, and may include various logic circuitry and programs to execute implementations described herein The memory 304 stores information within the computing device 300. In some implementations, the memory 304 may include one or more of a computer-readable medium, a volatile memory unit(s), or a non-volatile memory unit(s).

The storage device 306 is capable of providing mass storage for the computing device 300. In some implementations, the storage device 306 may include one or more mass storage devices, for example, magnetic, magneto optical disks, optical disks, EPROM, EEPROM, flash memory devices, and may be implemented as internal hard disks, removable disks, magneto optical disks, CD ROM, or DVD-ROM disks for storing data. In some implementations, the storage device 306 may include a non-tangible computer-readable storage medium that contains instructions, which when executed, perform one or more methods or portions of the methods described above. In some implementations, the storage device 306 may store rules for determining whether information can be acquired based on one or more parameters provided by a user.

The high speed controller 308 manages bandwidth-intensive operations for the computing device 300, while the low speed controller 312 manages lower bandwidth-intensive operations. Such allocation of duties is exemplary. In some implementations, the high-speed controller 308 is coupled to memory 304, display 316 (e.g., through a graphics processor or accelerator), and to high-speed expansion ports 310, which may accept various expansion cards (not shown). In some implementations, a low-speed controller 312 is coupled to storage device 306 and low-speed expansion port 314. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 300 may be implemented in a number of different forms, as shown in the figure. For example, computing device 300 may be implemented as a standard server 420, a group of such servers, or as part of a rack server system. The server 420 may be, for example, one or more of a network server, a playlist sharing application server, a content server, a playlist management server. In some implementations, the computing device 300 may be implemented as a personal computer such as a laptop computer.

In some implementations, the computing device 300 may wirelessly communicate with device 350 over one or more networks to execute one or more operations of the method described in FIG. 2. In some implementations, the computing device 300, when operating as a content provider, may receive a request for information from device 350 and, in response, may provide the requested content to device 350. In some implementations, the computing device 300 execute one or more of the operations illustrated in FIG. 2 and may control device 350 to display the AIR and fetching parameter interfaces and to receive user inputs.

The one or more networks connecting computing devices 300 and 350 may include access points, storage systems, cloud systems, modules, one or more databases including one or more media databases, and servers including one or more network servers such as computing device 300. The one or more network servers may include any suitable computing device coupled to the one or more networks, including but not limited to a personal computer, a server computer, a series of server computers, a mini computer, and a mainframe computer, or combinations thereof. The one or more network servers may also include an application server, a web server, or a series of servers, running a network operating system, examples of which may include but are not limited to Microsoft® Windows® Server, Novell® NetWare®, or Linux®. The one or more network servers may be used for and/or provide cloud and/or network computing and media provision services. Although not shown in the figures, the server may have connections to external systems providing messaging functionality such as e-mail, SMS messaging, text messaging, and other functionalities, such as advertising services, search services, etc.

In some implementations, the one or more networks may include a cloud system that may provide Internet connectivity and other network-related functions. For example, the cloud system may provide storage services for at least a portion of the data transmitted between components of the system.

The cloud system or one or more networks may also include one or more databases, which may include a media storage database, a media provision database, a cloud database, or a database managed by a database management system (DBMS). A DBMS may be implemented as an engine that controls organization, storage, management, and retrieval of data in a database. DBMSs frequently provide the ability to query, backup and replicate data, enforce rules, provide security, do computation, perform change and access logging, and automate optimization. A DBMS typically includes a modeling language, data structure, database query language, and transaction mechanism. The modeling language is used to define the schema of each database in the DBMS, according to the database model, which may include a hierarchical model, network model, relational model, object model, or some other applicable known or convenient organization. Data structures can include fields, records, files, objects, and any other applicable known or convenient structures for storing data. A DBMS may also include metadata about the data that is stored.

Computing device 350 may include a processor 352, memory 364, a user interface such as a display 354, a communication interface 366, and a transceiver 368, among other components. Each of the components 350, 352, 364, 354, 366, and 368, may be interconnected using various buses, and several of the components may be mounted on a common motherboard or in other manners as appropriate.

The transceiver 368 may include a transmitter and a receiver and may be utilized to communicate with devices in the one or more networks and components within computing device 350. The transceiver 368 may include amplifiers, modulators, demodulators, antennas, and various other components. The transceiver 368 may direct data received from other external devices, such as servers, databases, portable devices connected to a wireless network, to other components in the computing device 350 such as the processor 352 and memory 364. The transceiver 368 may also direct data received from components in the computing device 350 to external devices.

Device 350 may communicate wirelessly through communication interface 366, which may include digital signal processing circuitry where necessary. Communication interface 366 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 368. In addition, short-range communication may occur, such as using a Bluetooth, WiFi, or other such transceiver (not shown). In addition, GPS receiver module 370 may provide location services and additional wireless data to device 350, which may be used by applications running on device 350.

Memory 364 stores information within the computing device 350, and, in some implementations, may also be coupled to one or more additional storage devices to provide additional storage. The memory 364 may include a computer-readable storage medium or store one or more modules of computer program instructions encoded on a computer-readable storage medium for execution by, or to control the operation of, data processing apparatus. The computer-readable medium may be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, for example, code that constitutes processor firmware, a protocol stack, a database management system, an operating system, or a combination of one or more of them. A propagated signal is an artificially generated signal, for example, a machine-generated electrical, optical, or electromagnetic signal that is generated to encode information for transmission to suitable receiver apparatus.

A computer program, also known as a program, software, software application, script, plug-in, or code, may be written in any form of programming language, including compiled or interpreted languages, and it may be deployed in any form, including as a standalone program or as a module, component, subroutine, or other unit suitable for use in a computing environment. A computer program does not necessarily correspond to a file in a file system. A program may be stored in a portion of a file that holds other programs or data in a single file dedicated to the program in question, or in multiple coordinated files. A computer program may be deployed to be executed on one computer or on multiple computers that are located at one site or distributed across multiple sites and interconnected by a communication network.

In some implementations, the memory 364 may be a volatile memory unit or units. In some implementations, the memory 364 may be a non-volatile memory unit or units.

Expansion memory 374 may also be provided and connected to device 350 through expansion interface 372, which may include, for example, a SIMM card interface. Such expansion memory 374 may provide extra storage space for device 350, or may also store applications or other information for device 350. For example, expansion memory 374 may include instructions to carry out or supplement the processes described above, and may include secure information also. Thus, for example, expansion memory 374 may be provide as a security module for device 350, and may be programmed with instructions that permit secure use of device 350. In addition, secure applications may be provided via the SIMM cards, along with additional information, such as placing identifying information on the SIMM card in a non-hackable manner.

The memory may include, for example, one or more mass storage devices, for example, magnetic, magneto optical disks, optical disks, EPROM, EEPROM, flash memory devices, and may be implemented as internal hard disks, removable disks, magneto optical disks, CD ROM, or DVD-ROM disks for storing data. In some cases, the memory may store rules for determining whether information can be acquired based on one or more parameters provided by a user, and may include a cache for temporarily storing the acquired information.

The processes and logic flows described in this specification may be performed by one or more programmable processors executing one or more computer programs to perform actions by operating on input data and generating output. The processes and logic flows may also be performed by, and apparatus may also be implemented as, special purpose logic circuitry, for example, an FPGA (field programmable gate array) or an ASIC (application specific integrated circuit).

Processors suitable for the execution of a computer program include, by way of example, both general and special purpose microprocessors, and any one or more processors of any kind of digital computer. The processor 352 can process instructions for execution within the computing device 350, including instructions stored in the memory 364. The processor may also include separate analog and digital processors. The processor may provide, for example, for coordination of the other components of the device 350, such as control of user interfaces, applications run by device 350, and wireless communication by device 350. Generally, a processor may control operations of the computing device 350, and may include various logic circuitry and programs to execute the various implementations described herein.

Processor 352 may communicate with a user through a user interface that includes a control interface 358 and display interface 356 coupled to a display 354. The display 354 may be implemented through suitable displays including, for example, a projection display, a liquid crystal display (LCD), or light emitting diode (LED) display, to display various data. For example, in some implementations, the display of the user interface 326 may display the AIR interface or the fetching parameter interface. The display interface 356 may comprise appropriate circuitry for driving the display 354 to present graphical and other information to a user. The control interface 358 may receive commands from a user and convert them for submission to the processor 352. In addition, an external interface 362 may be provide in communication with processor 352, so as to enable near area communication of device 350 with other devices. External interface 362 may provide, for example, for wired communication (e.g., via a docking procedure) or for wireless communication (e.g., via Bluetooth or other such technologies).

Device 350 may also communicate audibly using audio codec 360, which may receive spoken information from a user and convert it to usable digital information. Audio codec 360 may likewise generate audible sound for a user, such as through a speaker, e.g., in a handset of device 350. Such sound may include sound from voice telephone calls, may include recorded sound (e.g., voice messages, music files, etc.) and may also include sound generated by applications operating on device 350.

The audio codec 360 may, in some cases, be connected to or implemented with a microphone or speaker. In some implementations, messages, such as a rejection message indicating that the requested information may not be acquired using the fetching parameter values provided by the user, may be communicated through audio signals emitted from speakers. In some implementations, certain applications, such as speech-to-text applications may be executed by receiving audio or voice signals through the microphone.

Although not shown, computing device may also include sensors and input unit(s). Sensors may include, for example, an optical sensor, capacitive sensor, charge-coupled device sensor, gyroscope, microphone, altimeter, impact sensor, piezoelectric sensor, motion sensor, biosensor, active pixel sensor, and various other sensors. The input unit(s) may include various devices that are configured to receive one or more inputs. For example, the input unit may include a mouse, touch pad, or keyboard for receiving alphanumeric text.

The implementations noted above describe exemplary scenarios, systems, and methods in which a user may specify one or more parameters for obtaining or downloading content before a time the user anticipates not having access to a wireless network connection. Similar implementations may be executed in order to upload content before a time the user anticipates not having wireless connection. For example, a user may anticipate not having access to the Internet at some time in future, and may provide parameters for the user device to upload data from the user device to a particular destination, such as a cloud network, database, or server. The system may then process the parameters and indicate to the user whether such an upload can be executed.

While this specification contains many specifics, these should not be construed as limitations on the scope of the disclosure or of what may be claimed, but rather as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and may even be claimed as such, one or more features from a claimed combination may in some cases be excised from the combination, and the claimed combination may be directed to a sub-combination or variation of a sub-combination.

Similarly, while actions are depicted in the drawings in a particular order, this should not be understood as requiring that such actions be performed in the particular order shown or in sequential order, or that all illustrated actions be performed, to achieve desirable results. Moreover, the separation of various system components in the embodiments described above should not be understood as requiring such separation in all embodiments, and it should be understood that the described program components and systems may generally be integrated together in a single software product or packaged into multiple software products.

It should be understood that the phrase one or more of and the phrase at least one of include any combination of elements. For example, the phrase one or more of A and B includes A, B, or both A and B. Similarly, the phrase at least one of A and B includes A, B, or both A and B.

Thus, particular implementations have been described. Other implementations are within the scope of the following claims. For example, the actions recited in the claims may be performed in a different order and still achieve desirable results.

What is claimed is:

1. A computer-implemented method comprising:
   receiving, by one or more computing devices, a request to acquire data at a first future time using a graphical user interface displayed by a user device;
   receiving, by the one or more computing devices and through the graphical user interface, one or more user-selected parameters to configure an acquisition of the data at the first future time, the one or more user-selected parameters comprising a size limit for the data to be acquired;
   determining, by the one or more computing devices, whether the data is downloadable according to the one or more user-selected parameters at the first future time;
   in response to determining that the data is downloadable according to the one or more user-selected parameters, obtaining, by the one or more computing devices from one or more content delivery servers, the data at the first future time;
   receiving, by one or more computing devices, a request to output the obtained data at a second future time that occurs after the first future time; and
   in response to receiving the request to output the obtained data at the second future time, controlling, by the one or more computing devices, a display connected to the user device to output the obtained data at the second future time.

2. The computer-implemented method of claim 1, wherein:
   the one or more user-selected parameters comprising, an indication of the first future time, a content type, a likely financial cost to purchase the data, and a wireless connectivity threshold; and
   values for the one or more user-selected parameters are received from a touch input and through the graphical user interface implemented on a touch screen of the user device.

3. The computer-implemented method of claim 1, wherein determining, by the one or more computing devices, whether the data is downloadable according to the one or more user-selected parameters at the first future time includes:
   determining a likely level of wireless connectivity of the user device at the first future time; and
   determining that an entirety of the data is downloadable at the determined likely level of wireless connectivity during a threshold time period beginning with the first future time.

4. The computer-implemented method of claim 3, wherein the threshold time period is (i) a time period during which the user device is likely to remain connected to a wireless network at or above a particular wireless connectivity threshold level, or (ii) a time period selected by a user input.

5. The computer-implemented method of claim 1, wherein the second future time is a time at which the user device is not connected to a wireless network.

6. The computer-implemented method of claim 1, wherein determining, by the one or more computing devices, whether the data is downloadable according to the one or more user-selected parameters at the first future time includes:
   determining a likely level of wireless connectivity of the user device at the first future time;
   determining that an entirety of the data is not downloadable at the determined likely level of wireless connectivity during a threshold time period beginning with the first future time; and
   generating a rejection message indicating that the data cannot be acquired.

7. The computer-implemented method of claim 2, wherein determining, by the one or more computing devices, whether the data is downloadable according to the one or more user-selected parameters at the first future time includes one or more of:
   determining that the user device has access to store data having the content size and the content type in a storage unit; and
   determining that payment information for purchasing the data is valid and accessible by the one or more computing devices.

8. A non-transitory computer-readable storage medium comprising instructions, which, when executed by one or more computers, cause the one or more computers to perform operations comprising:
   receiving a request to acquire data at a first future time using a graphical user interface displayed by a user device;
   receiving, through the graphical user interface, one or more user-selected parameters to configure an acquisition of the data at the first future time, the one or more user-selected parameters comprising a size limit for the data to be acquired;
   determining whether the data is downloadable according to the one or more user-selected parameters at the first future time;
   in response to determining that the data is downloadable according to the one or more user-selected parameters, obtaining, from one or more content delivery servers, the data at the first future time;
   receiving a request to output the obtained data at a second future time that occurs after the first future time; and
   in response to receiving the request to output the obtained data at the second future time, controlling a display connected to the user device to output the obtained data at the second future time.

9. The non-transitory computer-readable storage medium of claim 8, wherein:
   the one or more user-selected parameters comprising, an indication of the first future time, a content type, a likely financial cost to purchase the data, and a wireless connectivity threshold; and
   values for the one or more user-selected parameters are received from a touch input and through the graphical user interface implemented on a touch screen of the user device.

10. The non-transitory computer-readable storage medium of claim 8, wherein determining, by the one or more computing devices, whether the data is downloadable according to the one or more user-selected parameters at the first future time includes:
   determining a likely level of wireless connectivity of the user device at the first future time; and
   determining that an entirety of the data is downloadable at the determined likely level of wireless connectivity during a threshold time period beginning with the first future time.

11. The non-transitory computer-readable storage medium of claim 10, wherein the threshold time period is (i) a time period during which the user device is likely to remain connected to a wireless network at or above a particular wireless connectivity threshold level, or (ii) a time period selected by a user input.

12. The non-transitory computer-readable storage medium of claim 8, wherein the second future time is a time at which the user device is not connected to a wireless network.

13. The non-transitory computer-readable storage medium of claim 8, wherein determining whether the data is downloadable according to the one or more user-selected parameters at the first future time includes:
   determining a likely level of wireless connectivity of the user device at the first future time;
   determining that an entirety of the data is not downloadable at the determined likely level of wireless connectivity during a threshold time period beginning with the first future time; and
   generating a rejection message indicating that the data cannot be acquired.

14. The non-transitory computer-readable storage medium of claim 9, wherein determining whether the data is downloadable according to the one or more user-selected parameters at the first future time includes one or more of:
   determining that the user device has access to store data having the content size and the content type in a storage unit; and
   determining that payment information for purchasing the data is valid and accessible by the one or more computing devices.

15. A system comprising:
   one or more computers and one or more storage devices storing instructions that are operable and when executed by one or more computers, cause the one or more computers to perform actions comprising:
   receiving a request to acquire data at a first future time using a graphical user interface displayed by a user device;
   receiving, through the graphical user interface, one or more user-selected parameters to configure an acquisition of the data at the first future time, the one or more user-selected parameters comprising a size limit for the data to be acquired;
   determining whether the data is downloadable according to the one or more user-selected parameters at the first future time;
   in response to determining that the data is downloadable according to the one or more user-selected parameters, obtaining, from one or more content delivery servers, the data at the first future time;
   receiving a request to output the obtained data at a second future time that occurs after the first future time; and
   in response to receiving the request to output the obtained data at the second future time, controlling a display connected to the user device to output the obtained data at the second future time.

16. The system of claim 15, wherein:
the one or more user-selected parameters comprising, an indication of the first future time, a content type, a likely financial cost to purchase the data, and a wireless connectivity threshold; and
values for the one or more user-selected parameters are received from a touch input and through the graphical user interface implemented on a touch screen of the user device.

17. The non-transitory computer-readable storage medium of claim 15, wherein determining, by the one or more computing devices, whether the data is downloadable according to the one or more user-selected parameters at the first future time includes:
determining a likely level of wireless connectivity of the user device at the first future time; and
determining that an entirety of the data is downloadable at the determined likely level of wireless connectivity during a threshold time period beginning with the first future time.

18. The non-transitory computer-readable storage medium of claim 17, wherein:
the threshold time period is (i) a time period during which the user device is likely to remain connected to a wireless network at or above a particular wireless connectivity threshold level, or (ii) a time period selected by a user input; and
the second future time is a time at which the user device is not connected to a wireless network.

19. The system of claim 15, wherein determining whether the data is downloadable according to the one or more user-selected parameters at the first future time includes:
determining a likely level of wireless connectivity of the user device at the first future time;
determining that an entirety of the data is not downloadable at the determined likely level of wireless connectivity during a threshold time period beginning with the first future time; and
generating a rejection message indicating that the data cannot be acquired.

20. The system of claim 16, wherein determining whether the data is downloadable according to the one or more user-selected parameters at the first future time includes one or more of:
determining that the user device has access to store data having the content size and the content type in a storage unit; and
determining that payment information for purchasing the data is valid and accessible by the one or more computing devices.

21. The computer-implemented method of claim 1, wherein determining, by the one or more computing devices, whether the data is downloadable according to the one or more user-selected parameters at the first future time comprises:
obtaining a location history of the user device;
determining that the user device has previously been in a present location of the user device;
determining an average period of time the user device remains in the present location; and
determining that the average period of time is a time duration that the user is likely to remain wirelessly connected.

22. The computer-implemented method of claim 1, wherein determining, by the one or more computing devices, whether the data is downloadable according to the one or more user-selected parameters at the first future time further comprises:
identifying one or more resources from which the data can be acquired;
determining a size of a file associated with the data that can be acquired from the one or more resources; and
determining that the size of the file associated with the data that can be acquired from the one or more resources is less than or equal to the user-specified size limit for the data to be acquired and that a storage capacity of the user device is equal to or greater than the size of the file associated with the data that can be acquired from the one or more resources.

* * * * *